Feb. 16, 1937.   N. C. HUNT   2,071,204

VALVE

Filed Jan. 4, 1935    3 Sheets-Sheet 1

Inventor
N. C. Hunt
By Pearne and Bishop
Attorneys

Feb. 16, 1937.　　　　N. C. HUNT　　　　2,071,204
VALVE
Filed Jan. 4, 1935　　　3 Sheets-Sheet 2

Inventor
N. C. Hunt
By Frease and Bishop
Attorneys

Patented Feb. 16, 1937

2,071,204

UNITED STATES PATENT OFFICE 2,071,204

VALVE

Nathan C. Hunt, Salem, Ohio

Application January 4, 1935, Serial No. 315

19 Claims. (Cl. 251—8)

The invention relates to valves for pressure lines utilized in transmitting air, water, oil or other fluids under pressure, and to valves for lines used interchangeably as pressure or vacuum lines.

Such air pressure, oil and vacuum lines include among others, lines for operating pneumatic tools, lines used in connection with various types of foundry equipment, rubber working equipment, testing apparatus, spray painting equipment, oil lines and pumps, and the like.

Such water pressure lines include among others, various types of hose lines, sprinkling system lines, and road and building construction lines, as well as hydraulic presses and machinery.

Numerous valves of the cock type have been made in the past for use in pressure and vacuum lines, but cock type valves usually include a tapered valve and valve seat which must be very accurately fitted together, and which only properly function for a short time before leakage occurs in the line at the valve.

Certain prior types of valves have been provided with means for bleeding the exhausting end of the pressure line when the valve is in "off" position, but it is sometimes desirable to hold pressure in the exhausting end of the line when the valve is in "off" position.

It is therefore an object of the present invention to provide a valve for a pressure line which may be readily, quickly, easily and almost instantaneously operated to cut off the flow of liquid under pressure through a pipe line without having any leakage whatsoever at the valve, regardless of the amount of pressure in the line.

Another object is to provide a valve for a pressure line having an "on" position, an "off" position, and an "off and bleeding" position.

Another object is to provide a valve for a pressure line having sealing means which is directly acted upon by the pressure in the line to increase its sealing capacity or effectiveness when the pressure in the line is increased regardless of whether the valve is in "on" or "off" position.

A further object is to provide a valve for a pressure line, in which valve the pressure in the line acts to hold the valve in the position at which it is set, regardless of whether the valve is in "on" or "off" or "off and bleeding" position.

Moreover, it is an object of the present invention to provide a valve adapted to be located in a line utilized interchangeably as a pressure or a vacuum line, which valve may be quickly and easily operated from "on" to "off" position and from "off" to "on" position, without any leakage whatsoever at the valve, regardless of whether the line in which the valve is located is being used as a pressure or a vacuum line.

Another object is to provide a valve having packing means and means engaging the packing means for urging said packing means toward sealing position at all times.

A further object is to provide a valve having packing means and spring actuated means cooperatively engaging the packing means for producing positive sealing at the valve in all positions, regardless of whether the valve is being used in a pressure or a vacuum line.

A still further object is to provide a valve of the sleeve type which may be operated by the most inexperienced person from "on" to "off" position or "off" to "on" position, either by a longitudinal movement or a combined rotary and longitudinal movement.

And finally, it is an object of the present invention to provide a valve construction capable of attaining all of the foregoing desiderata, which valve is very efficient in use, and the constituent parts of which are cheap and easy to manufacture and of extremely simple design.

These and other objects may be attained by providing a construction of which preferred embodiments are hereinafter set forth in detail, and which may be stated in general terms as including a by-pass valve body, a valve sleeve, packing means interposed between the valve body and the valve sleeve, and spreader means engaging the packing means for urging the packing means toward sealing position at all times; the by-pass valve body, valve sleeve and packing means in one embodiment being so arranged and proportioned as to provide an "on" position, an "off" position, and an "off and bleeding" position.

Preferred embodiments of the present invention are illustrated in the accompanying drawings, in which.

Similar numerals refer to similar parts throughout the drawings.

Figure 1:
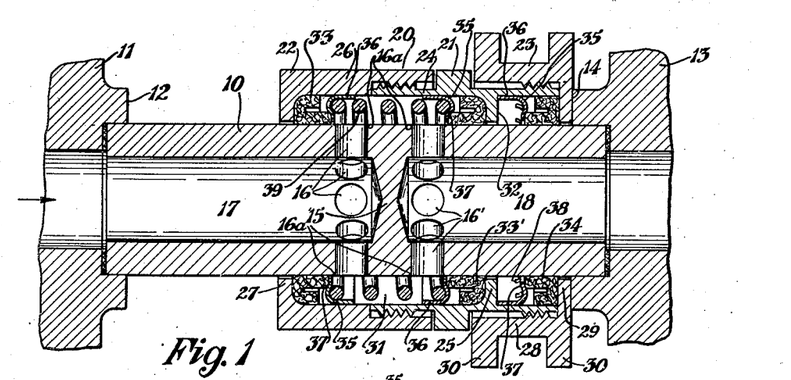
Figure 1 is a longitudinal sectional view of one embodiment of the improved valve for use in a pressure line, the valve being shown in "on" position.
Figure 2:
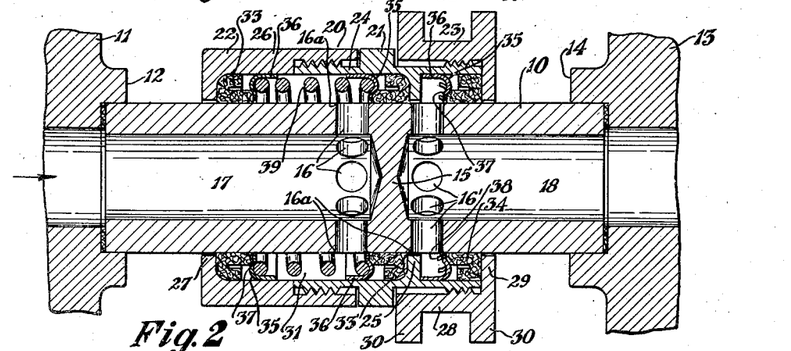
Fig. 2 is a longitudinal section of the valve of Fig. 1 in "off" position.
Figure 3:
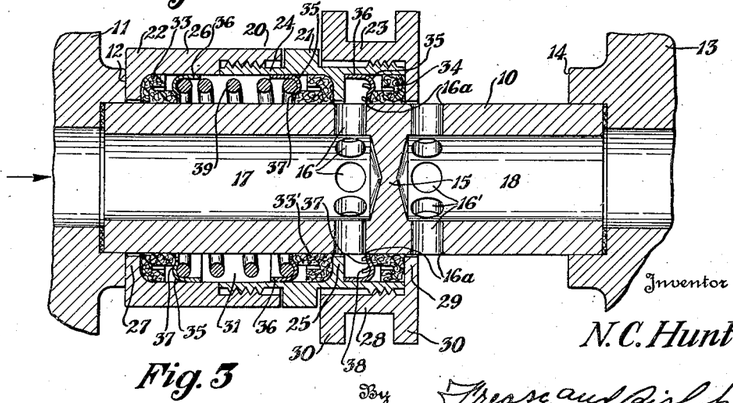
Fig. 3 is a longitudinal section of the valve of Fig. 1, in "off and bleeding" position.

The embodiment of the improved valve shown in Figs. 1, 2 and 3 includes the valve body 10, having a sealed connection at one end with a pressure side fluid conduit indicated at 11 and provided with a stop shoulder 12. The other end of the valve body 10 has a sealed connection with an exhaust side fluid conduit indicated at 13 and provided with a stop shoulder 14.

The valve body 10 is preferably cylindrically tubular in shape, having an integral transverse dividing or partition wall 15 formed intermediate its ends for interrupting the flow of any fluid medium therethrough. The portion of the valve body between the partition wall 15 and the pressure side conduit 11 may be termed as pressure side, and the portion of the valve body between the partition wall 15 and the exhaust side conduit 13 may be termed its exhaust side.

It is pointed out that any form of pipe or hose connection adapter members may be substituted for the pressure and exhaust side conduits 11 and 13, in order to meet the particular requirements of the pressure line in which the valve is to be located. However, any form of conduit or adapter members substituted for the conduits 11 and 13 must have stop shoulder portions located at predetermined distances from the partition wall 15, for a purpose hereinafter set forth.

The tubular walls of the valve body 10 are provided with a plurality of radially disposed by-pass openings or ports 16, located adjacent the partition wall 15 in the pressure side of the valve body and communicating with the pressure compartment bore 17 of the valve body. Likewise, the tubular walls of the valve body 10 are provided with a plurality of radially disposed by-pass openings or ports 16', similar to ports 16, and located adjacent the partition wall 15 in the exhaust side of the valve body and communicating with the exhaust compartment bore 18 of the valve body.

A valve sleeve, indicated generally at 20, is preferably slidably and rotatably mounted on the tubular valve body for longitudinal movement between the stop shoulders 12 and 14. The sleeve 20 preferably includes an intermediate sleeve member 21, a pressure side sleeve member 22 and an exhaust side sleeve member 23.

The intermediate sleeve member 21 includes a cylindrical portion 24 having external screw threads at its ends. The intermediate sleeve member 21 is provided intermediate its ends with an inwardly extending annular flange 25 for fitting loosely around the valve body 10.

The pressure side sleeve member 22 includes a cylindrical portion 26 having an internal screw thread for screwing onto the pressure side end of the cylindrical portion 24 of sleeve 21, and also includes an inwardly extending annular flange 27 for loosely fitting around the valve body 10 at the pressure side end of the sleeve 20.

The exhaust side sleeve member 23 includes a cylindrical portion 28 having an internal screw thread for screwing onto the exhaust side end of the cylindrical portion 24 of sleeve 21, and also includes an inwardly extending annular flange 29 for fitting around the valve body 10 at the exhaust side end of the sleeve 20.

One of the sleeve members, preferably the exhaust side sleeve member 23, is provided with outwardly projecting flanges 30 for being engaged by a shifting lever or other valve operating member.

When the sleeve members 21, 22, and 23, are assembled, as shown in Figs. 1, 2, and 3, to form the valve sleeve 20, the annular flanges 25 and 27 form an internal annular groove 31 in the pressure side end of the valve sleeve. Likewise, the annular flanges 25 and 29 form an internal annular groove 32 in the exhaust side end of the valve sleeve.

Flexible channel-shaped or U-shaped packing rings 33 and 33', preferably of leather, are interposed between the valve body 10 and the sleeve 20 and located in opposite ends of the groove 31, the ring 33 abutting flange 27, and the ring 33' abutting flange 25. The legs or annular flange portions of the rings 33 and 33' are substantially parallel with the longitudinal axis of the valve so as to abut the outer surface of the valve body and the inner surface of the internal groove 31, and the open sides of the rings 33 and 33' are directed toward each other.

A flexible channel-shaped or U-shaped packing ring 34, similar to the rings 33 and 33', is interposed between the valve body 10 and the sleeve 20 and located in the internal groove 32 abutting the flange 29. The legs or annular flanges of ring 34 are also substantially parallel with the longitudinal axis of the valve, and the open side of the ring 34 is directed toward the annular groove 31, that is, toward the pressure side end of the sleeve 20.

Preferably, the outer peripheral edges of the ports 16 and 16' are rounded or curved at 16a in order to remove sharp edges which would cut into and destroy the leather packing rings 33' and 34 as the sleeve 20 slides to and fro along the valve body, when the packing rings are under full line pressure.

By forming the valve sleeve 20 of three separate sleeve members, the internal grooves 31 and 32 may be easily and accurately machined, so that their surfaces accurately conform to the outer surfaces of the packing rings 33, 33' and 34, which are located therein; and the separate sleeve members likewise enable the packing rings 33, 33', and 34 to be readily assembled therein.

The sleeve members 21, 22, and 23, and their annular flanges 25, 27, and 29, are so proportioned and arranged with respect to the stop shoulders 12 and 14 that when the flange 29 abuts the stop shoulder 14, the valve is in "on" position, as shown in Fig. 1. In this position, that portion of the internal groove 31 between the packing rings 33 and 33', communicates with both sets of ports 16 and 16', so that fluid entering the pressure side compartment 17 is by-passed through the ports 16, internal groove 31, and ports 16' out through the exhaust side compartment 18.

Also, the proportioning and arrangement of the sleeve members and their annular flanges with respect to the stop shoulders is such that when the sleeve is substantially midway between the stop shoulders 12 and 14, the valve is in "off" position, as shown in Fig. 2. In this position, that portion of the internal groove 31 between the packing rings 33 and 33', communicates with the pressure side ports 16 only, and the internal groove 32 and the open side of the packing ring 34 communicate with the exhaust side ports 16'. Thus the fluid in the pressure side of the valve is sealed by the packing rings 33 and 33', and any fluid in the exhausting side of the valve is sealed by the packing ring 34 and by the packing ring 33', since the pressure on the open side of ring 33' is always greater than that directed against the closed side from ports 16'.

Moreover, the proportioning and arrangement of the sleeve members and their annular flanges with respect to the stop shoulders is such that when the annular flange 27 abuts the stop shoulder 12, the valve is in "off and bleeding" position, as shown in Fig. 3. In this position, the internal groove 32 and the open side of the ring 34 communicate with the pressure side ports 16 only, and the exhaust side ports 16' are uncovered to permit bleeding of the exhaust side of the valve. Any fluid under pressure which passes from the pressure side ports 16 under the annular flange 25 and past the packing ring 33', will be directed against the open side of packing ring 34 so as to force the legs or annular flanges of the ring 34 into sealing abutment with the valve body and the sleeve.

Means for urging the inner legs or annular flanges of the packing rings toward sealing position, that is, into abutment with the outer surface of the valve body, preferably includes annular spreader rings 35, one abutting the open side of the inner annular flange of each of the packing rings 33, 33', and 34.

Figures 6, 7, 8:
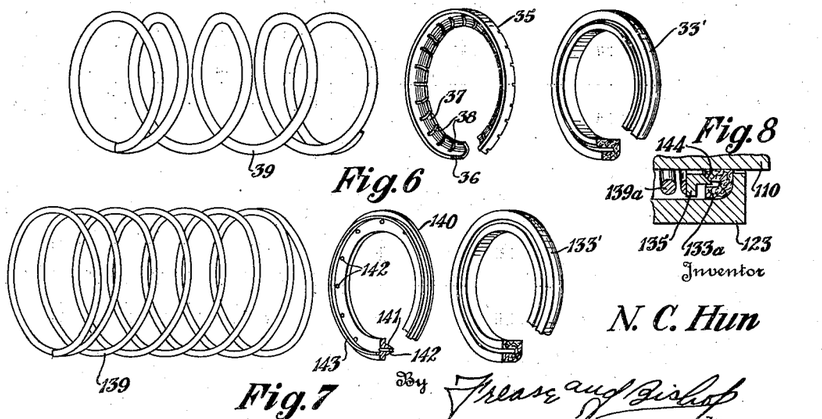
Fig. 6 is a detached perspective view of an assembly of a packing ring, packing ring spreader, and spring, as used in the valve shown in Figs. 1 to 4 inclusive.
Fig. 7 is a detached perspective of a similar assembly as used in the valve of Fig. 5.
Fig. 8 is a fragmentary sectional view of a valve similar to the valve in Fig. 4, showing a slightly different form of packing ring and spreader.

Each ring 35 is preferably of relatively thin and preferably springy sheet metal and includes a cylindrical flange 36 for fitting against the inner surface of the sleeve 20 and an inwardly extending flange 37 which is slotted at 38, as best shown in Fig. 6, and which abuts the outer edge of the inner annular flange of a packing ring at the open side thereof so that by forcing the spreader rings against the open sides of the packing rings, the inner legs or annular flanges of the packing rings will be pressed against the outer surface of the valve body.

Means for urging or forcing the spreader rings 35 against the open sides of packing rings 33 and 33', preferably includes a coil compression spring 39 interposed between the spreader rings abutting the open sides of packing rings 33 and 33', and located in the internal annular groove 31.

When the groove 31 is in communication with the pressure side ports 16, as shown in Figs. 1 and 2, the pressure fluid in the line has access to the open sides of the packing rings 33 and 33' through the slots 38 in the spreader rings 35 abutting the same, so that the pressure acts to spread the rings 33 and 33' to effect a tight seal between the valve sleeve and the valve body in both the "on" and the "off" position shown in Figs. 1 and 2 respectively.

When the exhaust side sleeve member 23 is screwed tightly upon the intermediate sleeve member 21, the annular flange 25 of sleeve member 21 abuts the cylindrical flange 36 of the spreader ring 35 abutting the open side of the packing ring 34, to force the spreader ring against the packing ring 34 and urge the inner leg or annular flange thereof toward sealing abutment with the outer surface of the valve body 10.

Thus, in the position of Fig. 2, the pressure from the exhaust side of the line acts through the slots 38 of the spreader ring in groove 32 to spread the packing ring 34 for sealing the same between the valve body and the sleeve, and in the position of Fig. 3, the pressure in the pressure side of the line acts through ports 16 to spread the packing ring 34 for sealing the same.

Accordingly, regardless of whether the valve is in "on", "off" or "off and bleeding" position, the pressure in the line acts upon the packing rings to maintain a perfect seal between the valve and the valve body.

As the pressure in the line increases, the sealing effectiveness of the packing rings also increases, thereby positively preventing any leakage at the valve.

The action of the line pressure on the packing rings functions to hold the valve sleeve at the position in which it is placed, because of the pressure of the inner legs or inner annular flanges of the packing rings against the valve body and the pressure of the outer legs or outer annular flanges of the packing rings against the inner surfaces of the sleeve.

Accordingly, the valve is unaffected by vibration or jarring, or by any accidental blow not intended to change the position of the valve sleeve.

The function of the spring 39 and the sleeve member 23 acting against the spreader rings 35, is to always urge the packing rings 33, 33', and 34 toward proper sealing position, so as to avoid any temporary leakage which might result from distortion or stiffening of the packing rings when the valve is not in constant use or under pressure.

Figure 4:
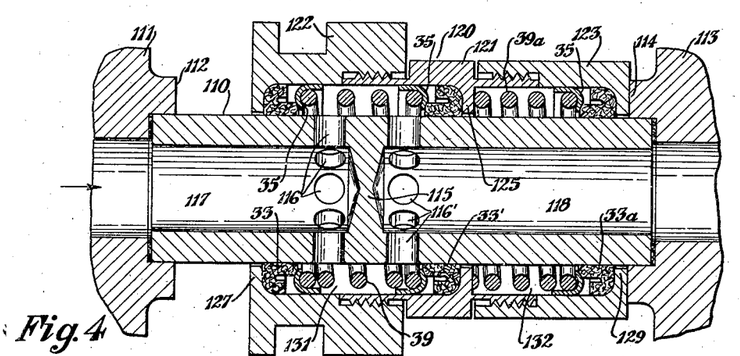
Fig. 4 is a longitudinal section of another embodiment of the improved valve for use in a pressure line, said valve being shown in "on" position.
Figure 5:
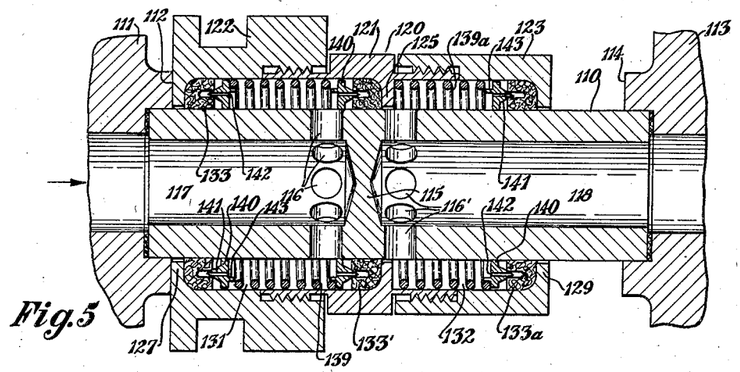
Fig. 5 is a longitudinal section of still another embodiment of the improved valve, as adapted for use in a line used interchangeably as a pressure or a vacuum line, and being shown in "off" position.

The improved embodiments of the valve illustrated in Figs. 4 and 5 are for use in a line where only two positions are required, namely, the "on" position and the "off" position. The valve shown in Fig. 4 is adapted for use in a pressure line, and the valve shown in Fig. 5 is adapted for use in a line which is used interchangeably as a pressure or a vacuum line.

In each of the embodiments of Figs. 4 and 5, the valve body 110 has a sealed connection at its pressure side with a pressure side fluid conduit 111 having the stop shoulder 112, and has a sealed connection at its exhaust side with an exhaust side fluid conduit 113 having a stop shoulder 114.

The valve body 110 has an integral dividing or partition wall 115 formed intermediate its ends for interrupting the flow of any fluid medium therethrough.

The tubular walls of the valve bodies 110 are provided with a plurality of radially disposed by-pass openings or ports 116 located adjacent the partition wall in the pressure side of the valve body and communicating with the pressure compartment bore 117 thereof. Likewise, the tubular walls of the valve body 110 are provided with a plurality of radially disposed by-pass openings or ports 116' located adjacent the partition wall in the exhaust side of the valve body and communicating with the exhaust compartment bore 118 thereof.

A valve sleeve indicated generally at 120, is preferably slidably and rotatably mounted on each tubular valve body 110 for longitudinal movement between the stop shoulders 112 and 114. Each sleeve 120 preferably includes the intermediate sleeve member 121, the pressure side sleeve member 122 and the exhaust side sleeve member 123. The intermediate sleeve member 121 includes externally threaded end portions and the pressure and exhaust side sleeve members 122 and 123 include internally threaded portions for screwing onto the intermediate sleeve member 121 to form the assembled sleeve indicated generally at 120.

Each intermediate sleeve member 121 is provided with an inwardly extending annular flange 125 and the pressure side sleeve member 122 is provided at its pressure side end with an inwardly extending flange 127. Likewise, each exhaust side sleeve member 123 is provided with an inwardly extending annular flange 129 at its exhaust side end.

When the sleeve members are assembled the annular flanges 125 and 127 form an internal groove 131 in the pressure side end of each valve sleeve, and the flanges 125 and 129 form an internal annular groove 132 in the exhaust side end of the valve sleeve.

Flexible U-shaped or channel-shaped packing rings 33 and 33', similar to or identical with the packing rings 33 and 33' in the valve shown in Figs. 1 to 3 inclusive, are located in the opposite ends of the groove 131 of the embodiment shown in Fig. 4, and a similar packing ring 33a is located in the groove 132 abutting the flange 129.

An annular spreader ring 35 is located abutting the outer edge of the inner annular flange of each of the packing rings 33, 33', and 33a, at the open side thereof and a coil compression spring 39 is interposed between the spreader rings 35 abutting packing rings 33 and 33', for urging the packing rings toward sealing position.

In this embodiment, the exhaust side sleeve member 123 is relatively long, forming a relatively long annular groove 132, and a coil compression spring 39a is interposed between the spreader ring 35 abutting the packing ring 33a and the annular flange 125, for urging the ring 33a toward sealing position.

The only difference between the valve shown in Fig. 4 and the valve shown in Fig. 5 is in the packing rings and the improved spreader rings abutting the same, in order to adapt the valve of Fig. 5 for use in a line used interchangeably as a pressure or a vacuum line.

In Fig. 5, the U-shaped packing rings 133 and 133' are located in the internal groove 131, and the U-shaped packing ring 133a is located in the internal groove 132.

The spreader or sealing rings 140 are located at the open sides of the packing rings, and are each provided with an annular rib 141 which is triangular or wedge-shaped in cross section, the apex of the rib being adapted to enter between and spread the annular flanges of the packing rings. A series of holes 142 are provided through the spreader rings 140 at the apex of the rib 141 for permitting fluid pressure to urge the annular flanges of the packing rings apart when the valve is under pressure.

A compression spring 139 is interposed between the spreader rings 140 abutting the packing rings 133 and 133', and a spring 139a is interposed between the flange 125 and the spreader ring abutting the packing ring 133a. Preferably, annular ribs 143 are provided on the spreader rings 140 for fitting inside of and centering the springs. The pressure of the springs 139 and 139a on the spreader rings 140 forces the wedge-shaped ribs 141 between the annular flanges of the packing rings to spread them apart and to urge the inner annular flange into sealing abutment with the valve body and the outer annular flange into sealing abutment with the inner surfaces of the sleeve 120, so as to always effect and maintain a tight seal between the valve body and the valve sleeve, regardless of whether the line is being used as a pressure line or as a vacuum line, because the force exerted by the compression springs acting to wedgeably spread the packing rings is sufficient to maintain a perfectly tight seal regardless of the amount of vacuum contained in the line.

The valve shown in Fig. 4 is shown in "on" position with the flange 129 abutting the stop shoulder 114. When the valve is moved to a position in which the flange 127 abuts the stop shoulder 112, the valve is in "off" position such as is shown in Fig. 5.

The fragmentary sectional view of Fig. 8 shows a valve similar to the valve in Fig. 4 employing a slightly different form of packing ring and spreader ring. The valve body is shown at 110 and a portion of the valve sleeve at 123. The packing ring 133a in Fig. 8 is preferably U-shaped and the inner annular flange thereof may have its outer edge beveled as shown at 144.

The spreader ring 135 in Fig. 8 is preferably L-shaped and the vertical leg of the L is engaged by the spring 139a to urge the spreader ring toward the packing ring 133a. The horizontal leg of the L is preferably beveled to conform to and engage the beveled edge 144 of the packing ring for urging the inner annular flange of the packing ring into sealing abutment with the valve body 110.

Figure 9:
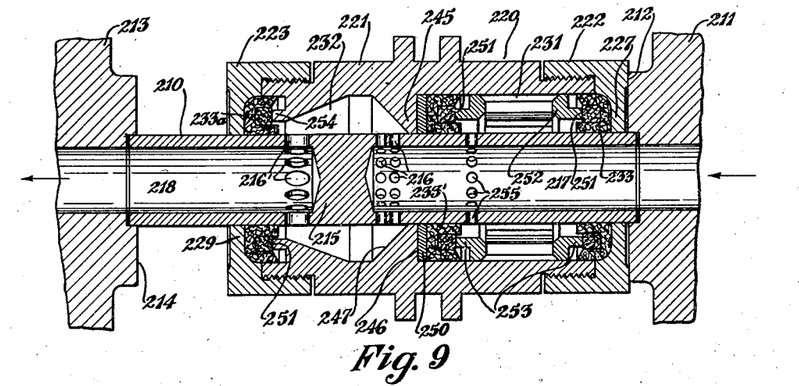
Fig. 9 is a longitudinal section of another embodiment of the improved valve for use in a pressure line, said valve being shown in "on" position.
Figure 10:
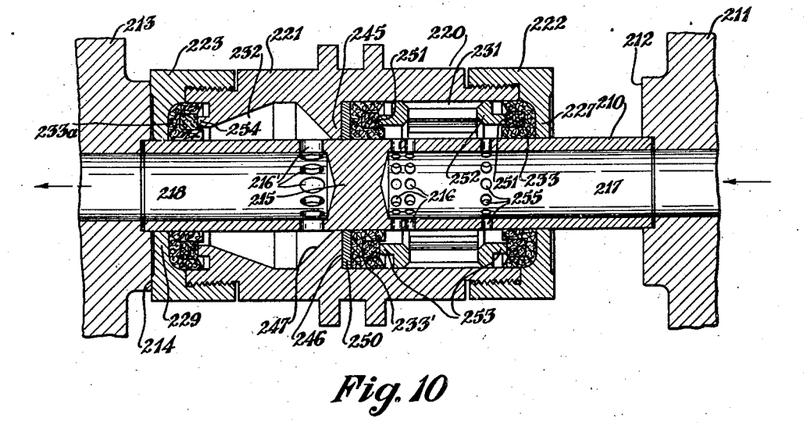
Fig. 10 is a longitudinal section of the valve of Fig. 9 in "off" position.

The improved embodiment of the valve shown in Figs. 9 and 10 is also for use in a line where only two positions are required, the "on" and the "off" position, and is especially adapted for use in high pressure hydraulic lines, although it may be used in other pressure lines and in combination pressure and vacuum lines. Fig. 9 shows the "on" position and Fig. 10 shows the "off" position of the valve.

The valve body 210 has a sealed connection at its pressure side with a pressure side fluid conduit 211 having the stop shoulder 212, and has a sealed connection at its exhaust side with an exhaust side fluid conduit 213 having a stop shoulder 214.

The valve body 210 has an integral dividing or partition wall 215 intermediate its ends for interrupting the flow of fluid medium therethrough. The tubular wall of the valve body 210 is provided adjacent the partition wall 215 with a plurality of radially disposed by-pass openings or ports 216 in the pressure side of the valve body and communicating with the pressure compartment bore 217 thereof, and with a plurality of radially disposed by-pass ports 216' in the exhaust side of the valve body and communicating with the exhaust compartment bore 218 thereof.

A valve sleeve indicated generally at 220 is preferably slidably and rotatably mounted on the valve body 210 for longitudinal movement between the stop shoulders 212 and 214. The sleeve 220 preferably includes the intermediate sleeve member 221, pressure side sleeve member 222 and exhaust side sleeve member 223, and the intermediate sleeve member 221 is externally threaded at its ends for receiving the internally threaded portions on the sleeves 222 and 223 to form the assembled sleeve indicated generally at 220.

The intermediate sleeve member 221 is provided with an inwardly extending annular portion 245, the inner surface of which is adapted to fit slidably around the valve body, and the pressure side of the annular portion 245 is preferably perpendicular to the axis of the valve as shown at 246, while the exhaust side of the portion 245 is preferably inclined as shown at 247.

The pressure side sleeve member 222 is provided at its pressure side end with an inwardly extending flange 227, and the exhaust side sleeve member 223 is provided with an inwardly extending flange 229 at its exhaust side end, so that when the sleeve members are assembled the annular portion 245 of the intermediate sleeve 221 and the flange 227 of sleeve 222 form an internal groove or annular chamber 231 between the pressure side of the valve sleeve and the pressure side of the valve body. Likewise, the annular portion 245 and the flange 229 of sleeve member 223 form an internal groove or annular chamber 232 between the exhaust side end of the valve sleeve and the valve body.

Flexible U-shaped packing rings 233 and 233' are located in the opposite ends of the annular chamber 231. The packing ring 233 abuts the flange 227 of sleeve member 222. A hardened steel ring 250 is provided between the vertical side 246 of annular portion 245 and the packing ring 233' for a purpose to be described.

A U-shaped packing ring 233a is located in the annular chamber 232 abutting the flange 229 of sleeve member 223. As shown in the drawings the packing ring 233 is located so as to seal the joint between the sleeve member 221 and 222, and packing ring 233a is located so as to seal the joint between sleeve member 221 and the sleeve member 223.

Preferably, flax packing 251 is provided between the annular flanges of each of the packing rings, and the flax packing has a relatively great capacity for absorbing water. The flax packings 251 are preloaded when the same are assembled with a spreader in the packing rings 233, 233' and 233a so as to tend to expand or spread apart the annular flange portions of the packing rings to urge them into sealing abutment with the valve body and valve sleeve respectively.

Preferably, a rigid spreader member 252 is located between the packing 233 and the packing 233', and is provided with flange portions 253 for abutting and holding the flax packings 251 in a preloaded or compressed condition in the packings 233 and 233' respectively. Similarly, an annular flange 254 is provided on the exhaust side end of the sleeve member 221 for abutting and compressing the flax packing in the packing ring 233a.

A plurality of auxiliary ports 255 are provided in the pressure side walls of the valve body 210, and communicating between the pressure compartment bore 217 and the annular chamber 231 so that as long as the valve is used as a pressure valve, pressure fluid is supplied to the chamber 231 and acts to urge the annular flanges of the packing rings into sealing abutment with the valve body and valve sleeve respectively.

When the valve is in open position as shown in Fig. 9, the pressure fluid will flow from the pressure compartment 217 through the ports 216, annular chamber 232, ports 216', and out through the opposite compartment 218. Any tendency of the pressure fluid to leak from the chamber 232 past the annular portion 245 and packing 233' is compensated for by the pressure fluid entering chamber 231 through ports 255, so that the packing 233' is substantially balanced by the pressure on opposite sides thereof.

As the valve is closed under high pressure and the annular portion 245 moves over the ports 216 to close the same, the velocity of the fluid passing through the ports under high pressure increases rapidly as the ports are being closed so that the inner surfaces of the annular portion 245 of the relatively soft metal sleeve member 221 are subjected to a severe abrasive, gouging, or scarfing action and become worn away relatively quickly.

By providing the hardened steel ring 250 abutting the annular portion 245, a hard wear resistant surface takes the wearing action at the ports as the softer metal portion 245 wears away, during the closing action of the valve. Moreover, the ring 250 moves across the ports 216 to effect the actual closing or opening of the valve. In other words, instead of the packing ring, the hardened steel ring 250 throttles the pressure side ports when the valve is moved between "on" and "off" position.

As the packing ring 233' moves across ports 216 during the opening or closing movement of the valve, the pressure in chamber 217 tends to force the inner annular flange of the packing ring outwardly away from the valve body, but due to the fact that the internal groove 231 always communicates with pressure chamber 217 through auxiliary ports 255, pressure is directed inwardly against the inner annular flange of packing ring 233' to balance the pressure from ports 216 and maintain the packing ring in sealing position.

Any of the embodiments of the improved valve herein illustrated may be used in a pressure line where it is desirable to shut off the pressure in the pressure side of the line and hold pressure in the exhaust side of the line without bleeding the exhaust side of the line, because each of the valves has an "off" position, in which the exhaust side ports are not uncovered.

The improved valve may be quickly and easily operated by the most inexperienced person to cut off the flow of liquid under pressure through the valve without any leakage at the valve, regardless of the amount of pressure in the line.

The improved valve is very efficient in use, and its constituent parts are cheap and easy to manufacture and of an extremely simple design.

I claim:

1. A valve including a tubular valve body having a transverse partition wall forming pressure and exhaust side compartments therein, there being ports in the tubular wall leading from each compartment, a sleeve mounted for movement on the valve body, there being an internal groove in said sleeve always communicating with pressure side ports in "on" and "off" positions, two flexible channel-shaped packing rings located in said internal groove of said sleeve and having their open sides directed toward each other, one of said packing rings being moved across pressure side ports to close the valve, the sleeve being provided at its exhaust side end with a second internal groove for communicating with the exhaust side ports when the sleeve is in "off" position, and a flexible channel-shaped packing ring located in said second internal groove and having its open side directed toward the pressure side end of said sleeve.

2. A valve including a tubular valve body having a transverse partition wall forming pressure and exhaust side compartments therein, there being ports in the tubular valve body leading from each compartment, a sleeve mounted for movement on the valve body, there being two internal grooves in said sleeve, one of said grooves always communicating with pressure side ports in "on" and "off" positions, one of said grooves establishing communication between pressure and exhaust side ports when the sleeve is in "on" position, two flexible channel-shaped packing rings located in the first mentioned internal groove, said packing rings having their open sides directed toward each other, one of said packing rings being moved across pressure side ports to close the valve, and a flexible channel-shaped packing ring located in the other internal groove and having its open side directed toward the pressure side end of said sleeve.

3. A valve including a tubular valve body having a transverse partition wall forming pressure and exhaust side compartments therein, there being ports in the tubular wall leading from each compartment, a sleeve mounted for movement on the valve body, there being an internal groove in said sleeve always communicating with said pressure side ports in "on" and "off" positions and establishing communication between all of said ports when the sleeve is in "on" position, two flexible channel-shaped packing rings located in the internal groove of said sleeve and having their open sides directed toward each other, spring-actuated means interposed between and engaging said packing rings for spreading the legs of said rings, the sleeve being provided at its exhaust side end with a second internal groove for communicating with the exhaust side ports when the sleeve is in "off" position, and a flexible channel-shaped packing ring located in said second internal groove and having its open side directed toward the pressure side end of said sleeve.

4. A valve including a tubular valve body having a transverse partition wall forming pressure and exhaust side compartments therein, there being ports in the tubular wall leading from each compartment, a sleeve mounted for movement on the valve body, there being an internal groove in said sleeve always communicating with said pressure side ports in "on" and "off" positions and establishing communication between all of said ports when the sleeve is in "on" position, two flexible channel-shaped packing rings located in the internal groove of said sleeve and having their open sides directed toward each other, spring-actuated means interposed between and engaging said packing rings for spreading the legs of said rings, the sleeve being provided at its exhaust side end with a second internal groove for communicating with the exhaust side ports when the sleeve is in "off" position, a flexible channel-shaped packing ring located in said second internal groove and having its open side directed toward the pressure side end of said sleeve, and means engaging the open side of the last-said packing ring for spreading the legs thereof.

5. A valve including a tubular valve body having a transverse partition wall forming pressure and exhaust side compartments therein, there being ports in the tubular wall leading from each compartment, a sleeve mounted for movement on the valve body, there being an internal groove in said sleeve always communicating with said pressure side ports and establishing communication between all of said ports when the sleeve is in "on" position, two flexible channel-shaped packing rings located in the internal groove of said sleeve and having their open sides directed toward each other, the sleeve being provided at its exhaust side end with a second internal groove for communicating with the exhaust side ports when the sleeve is in "off" position, a flexible channel-shaped packing ring located in said second internal groove and having its open side directed toward the pressure side end of said sleeve, and spring actuated means engaging the open sides of all of the packing rings for spreading the legs thereof.

6. A valve including a tubular valve body having a transverse partition wall forming pressure and exhaust side compartments therein, there being ports in the tubular wall leading from each compartment, a sleeve mounted for movement on the valve body, there being an internal groove in said sleeve always communicating with said pressure side ports in "on" and "off" positions and establishing communication between all of said ports when the sleeve is in "on" position, two flexible channel-shaped packing rings located in said internal groove of said sleeve and having their open sides directed toward each other, a spreader ring for each packing ring, each spreader ring having openings therein communicating with the open side of a packing ring, and means urging the spreader rings against the packing rings to spread the legs of the packing rings.

7. A valve including a tubular valve body having a transverse partition wall forming pressure and exhaust side compartments therein, there being ports in the tubular wall leading from each compartment, a sleeve mounted for movement on the valve body, there being an internal groove in said sleeve always communicating with said pressure side ports and establishing communication between all of said ports when the sleeve is in "on" position, two flexible channel-shaped packing rings located in the internal groove of said sleeve and having their open sides directed toward each other, each packing ring having an inner and outer annular flange, a sealing ring at the open side of each packing ring wedgeably engaging the inner annular flange thereof, and a spring interposed between said sealing rings for urging the inner annular flanges of the packing rings into sealing abutment against the valve body.

8. A valve including a tubular body having a transverse partition wall forming pressure and exhaust side compartments therein, there being ports in the tubular wall leading from each compartment, a sleeve mounted for movement on the valve body, the sleeve being provided with an internal groove always communicating with the pressure side ports in "on" and "off" positions and establishing communication with all of the ports in "on" position, two flexible channel-shaped packing rings located in the internal groove of said sleeve and having their open sides directed toward each other, the sleeve being provided at its exhaust side end with a second internal groove for communicating with the exhaust side ports when the sleeve is in "off" position, a flexible channel-shaped packing ring in said second internal groove and having its open side directed toward the pressure side end of said sleeve, said sleeve being adapted to uncover the exhaust side ports for providing an "off and bleeding" position, and said second internal groove communicating with the pressure side ports when the sleeve is in "off and bleeding" position.

9. A valve including a tubular valve body having walls forming pressure and exhaust side compartments, the walls having ports leading from the pressure and exhaust side compartments, a sleeve mounted for movement on the valve body and provided with an internal by-pass groove for selectively communicating with both the pressure and exhaust side ports when the valve is in "on" position or with the pressure side ports only when the sleeve is in "off" position, the sleeve being movable to uncover the exhaust side ports, sealing means in said by-pass groove interposed between the sleeve and valve body, and separate means interposed between the sleeve and the valve body for sealing the exhaust side ports when the sleeve is in "off" position and for sealing the pressure side ports when the exhaust side ports are uncovered.

10. In a valve including a valve body and a sleeve slidable thereon, a flexible channel-shaped packing ring interposed between the valve body and the sleeve and having an outer annular flange for abutting the sleeve and an inner annular flange for abutting the valve body, preloaded flax packing interposed between the annular flanges of the packing ring, and rigid spreading means abutting and compressing the flax packing for urging annular flanges of the packing ring into sealing abutment with the valve body and the sleeve respectively.

11. A valve including a tubular valve body having a transverse partition wall forming pressure and exhaust side compartments therein, there being ports in the tubular wall leading from each compartment, a sleeve mounted for movement on the valve body, there being an internal groove in said sleeve always communicating with pressure side ports, two flexible channel-shaped packing rings located in said internal groove and having their open sides directed toward each other, one of said packing rings being moved across pressure side ports to close the valve, the sleeve being provided with a second internal groove at its exhaust side end always communicating with exhaust side ports and establishing communication between pressure and exhaust side ports in "on" position, and a flexible channel-shaped packing ring in said second internal groove and having its open side directed toward the pressure side end of said sleeve.

12. A valve including a tubular valve body having a transverse partition wall forming pressure and exhaust side compartments therein, there being ports in the tubular wall leading from each compartment, a sleeve mounted for movement on the valve body, there being an internal groove in said sleeve always communicating with pressure side ports, two flexible channel-shaped packing rings located in said internal groove and having their open sides directed toward each other, one of said packing rings being moved across pressure side ports to close the valve, the sleeve being provided with a second internal groove at its exhaust side end always communicating with exhaust side ports and establishing communication between pressure and exhaust side ports in "on" position, a flexible channel-shaped packing ring in said second internal groove, and spreader means for urging the packing rings toward sealing position between the valve body and the valve sleeve.

13. A valve including a tubular valve body, a transverse partition wall forming pressure and exhaust side compartments therein, there being ports in the tubular wall leading from each compartment, a sleeve mounted for movement on the valve body and having an internal groove establishing communication between pressure and exhaust side ports in "on" position, a flexible channel-shaped packing ring in said groove for moving across pressure side ports to close the valve, and a metal ring of relatively hard material in the sleeve around the valve body located between the packing ring and said pressure side ports when the valve is in "on" position for throttling the pressure side ports when the valve is moved between "on" and "off" position.

14. A valve including a tubular valve body, a transverse partition wall forming pressure and exhaust side compartments therein, there being ports in the tubular wall leading from each compartment, a sleeve mounted for movement on the valve body and having an internal groove establishing communication between the pressure and exhaust side ports in "on" position, a flexible channel-shaped packing ring in said internal groove, there being auxiliary ports in the tubular wall leading from the pressure side compartment, the sleeve being provided with a second internal groove in its pressure side always communicating with said auxiliary ports, and two flexible channel-shaped packing rings in said second internal groove.

15. A valve including a tubular valve body, a transverse partition wall forming pressure and exhaust side compartments therein, there being ports in the tubular wall leading from each compartment, a sleeve mounted for movement on the valve body and having an internal groove establishing communication between the pressure and exhaust side ports in "on" position, there being auxiliary ports in the tubular wall leading from the pressure side compartment, the sleeve being provided with a second internal groove in its pressure side always communicating with said auxiliary ports, and a metal ring of relatively hard material in the sleeve and located around the valve body between the first and second internal grooves for throttling the pressure side ports when the valve is moved between "on" and "off" position.

16. A valve including a tubular valve body having a transverse partition wall forming pressure and exhaust side compartments therein, there being ports in the tubular wall leading from each compartment, a sleeve mounted for movement on the valve body, there being an internal groove in said sleeve always communicating with pressure side ports in "on" and "off" positions, two flexible channel-shaped packing rings located in said internal groove of said sleeve and having their open sides directed toward each other, the sleeve being provided at its exhaust side end with a second internal groove for communicating with the exhaust side ports when the sleeve is in "off" position, a flexible channel-shaped packing ring located in said second internal groove and having its open side directed toward the pressure side end of said sleeve, and means engaging the packing rings for resiliently urging said packing rings toward sealing position between the valve body and the valve sleeve, said means including a spreader member engaging each packing ring and a member abutting the spreader member.

17. A valve including a tubular valve body having a transverse partition wall forming pressure and exhaust side compartments therein, there being ports in the tubular valve body leading from each compartment, a sleeve mounted for movement on the valve body, there being two internal grooves in said sleeve, one of said grooves always communicating with pressure side ports in "on" and "off" positions, one of said grooves establishing communication between pressure and exhaust side ports when the sleeve is in "on" position, two flexible channel-shaped packing rings located in the first mentioned internal groove, said packing rings having their open sides directed toward each other, a flexible channel-shaped packing ring located in the other internal groove and having its open side directed toward the pressure side end of said sleeve, and spreader means engaging the packing rings for resiliently urging the annular flanges of each of the packing rings toward sealing position between the valve body and the valve sleeve, said means including a spreader member engaging at least one of the annular flanges of the packing ring and a member abutting said spreader member.

18. In a valve including a valve body and a sleeve slidable thereon, the valve body having pressure and exhaust ports therein and the sleeve having an internal groove always communicating with the pressure ports, two flexible channel-shaped packing rings located in said groove and having their open sides directed toward each other for being spread by pressure to sealing position, flax packings interposed between the annular flanges of the packing rings for spreading the flanges apart, and a rigid spreader located between the packing rings and abutting the flax packings.

19. A valve including a tubular valve body and a sleeve member mounted thereon for relative sliding movement, there being longitudinally spaced compartments in said sleeve member and longitudinally spaced ports in the tubular wall of the valve body for communicating with said compartments, a flexible channel-shaped packing ring in one of said compartments pressure sealed between the valve body and sleeve member for moving across one of said ports in the valve body to close the same, and a metal ring located abutting said packing ring for throttling said one port ahead of said packing ring when the valve is moved from "on" to "off" position for said port.

NATHAN C. HUNT.